United States Patent [19]

Neiheisel

[11] Patent Number: 5,229,571
[45] Date of Patent: Jul. 20, 1993

[54] HIGH PRODUCTION LASER WELDING ASSEMBLY AND METHOD

[75] Inventor: Gary L. Neiheisel, Cincinnati, Ohio

[73] Assignee: Armco Steel Co., L.P., Middletown, Ohio

[21] Appl. No.: 726,873

[22] Filed: Jul. 8, 1991

[51] Int. Cl.$^5$ .............................................. B23K 26/08
[52] U.S. Cl. ........................ 219/121.63; 219/121.64; 219/121.77; 219/121.82
[58] Field of Search ..................... 219/121.63, 121.64, 219/121.76, 121.77, 121.82, 121.83; 294/65

[56] References Cited

U.S. PATENT DOCUMENTS

| | | | |
|---|---|---|---|
| 4,250,372 | 2/1981 | Tani | 219/121.76 |
| 4,330,699 | 5/1982 | Farrow | 219/121.64 |
| 4,572,941 | 2/1986 | Sciaky et al. | 219/121.64 |
| 4,626,651 | 12/1986 | Taniguchi et al. | 219/121.63 |
| 4,691,093 | 9/1987 | Banas et al. | 219/121.63 |
| 4,733,815 | 3/1988 | Sturm | 228/4.1 |
| 4,751,365 | 6/1988 | LaRocca et al. | 219/121.64 |
| 4,767,143 | 8/1988 | Michael et al. | 294/65 |
| 4,769,522 | 9/1988 | Lentz et al. | 219/121.63 |
| 4,840,303 | 6/1989 | Fujii et al. | 219/121.63 |
| 4,857,697 | 8/1989 | Melville | 219/121.63 |
| 4,872,940 | 10/1989 | Strum et al. | 156/379.8 |
| 4,877,939 | 10/1989 | Duley et al. | 219/121.76 |
| 4,891,491 | 1/1990 | Duley et al. | 219/121.64 |
| 4,912,295 | 3/1990 | Arimochi et al. | 219/121.64 |
| 4,988,845 | 1/1991 | Bauer et al. | 219/121.63 |
| 5,023,427 | 6/1991 | Neiheisel et al. | 219/121.82 |
| 5,045,668 | 9/1991 | Neiheisel et al. | 219/121.63 |

FOREIGN PATENT DOCUMENTS

| | | |
|---|---|---|
| 405143 | 1/1991 | European Pat. Off. . |
| 60-108189 | 6/1985 | Japan . |

Primary Examiner—Geoffrey S. Evans
Attorney, Agent, or Firm—Frost & Jacobs

[57] ABSTRACT

A method for butt welding metallic sheets along a relatively long common seam line by providing a plurality of laser welding devices aligned above the common seam line, and effectively spaced from one another along a longitudinal axis. In a preferred embodiment, each welding device is independently adjustable in a direction parallel to a transverse axis which is perpendicular to the longitudinal axis. The metallic sheets are aligned on the upper surface in abutting relationship along the seam line and clamped for welding. Each laser welds only a portion of the sheets along the seam line, and the length of the relative movement between the welding devices and the sheets is greater than the effective spacing distance between welding devices to insure that a continuous weld bead is provided along the common seam line.

25 Claims, 5 Drawing Sheets

HIGH PRODUCTION LASER WELDING ASSEMBLY AND METHOD

TECHNICAL FIELD

This invention relates to an apparatus and method for butt welding metallic sheets along a relatively long common seam line, and, more particularly, to an improved apparatus and method for minimizing the cycle time for automatically loading, fixturing, and welding a plurality of metallic sheets along a relatively long common seam line, and removing the welded sheets for further processing, with such apparatus and method comprising the use of a plurality of laser welding heads which simultaneously weld overlapping portions of that common seam line.

BACKGROUND ART

In a wide variety of manufacturing and steel processing applications, it is often desirable or necessary to join together sheets or strips of metallic materials such as steel or the like. Such sheets to be joined may be of the same, similar, or different materials. As in any manufacturing operation, cycle time is an important factor in determining the relative cost and applicability of particular manufacturing procedures.

Laser welding of sheets or strips of metallic materials is a relatively highly competitive industry, wherein high volume and quality are absolutely critical to the success of a particular apparatus and/or method. To achieve these goals, high part cycle rates must be achieved. Inherently, each cycle is made up of a combination of sheet handling steps, sheet movement and fixturing, and welding operations. Sheet handling operations include supplying sheets to a welding device, preliminarily locating the sheets on the welding device, and removing a welded finished product therefrom. Preliminarily aligned sheets must thereafter be moved into abutted registration along a common seam line for welding, and fixtured in place to enable accurate welding. Maximum welding speeds are limited by power requirements and quality considerations, and the finished welded product must be removed from the welding area before subsequent sheets can be brought in for fixturing.

One attempt to increase the efficiency of laser welding operations is shown in U.S. Pat. No. 4,877,939, which issued to W. Duley, et al. Particularly, Duley et al. contemplated the pretreatment of the metallic materials with radiation at a shorter wavelength, such as ultraviolet radiation from an excimer laser, to reduce the reflectivity of the material to radiation in the infrared wavelength range. The shorter wavelength radiation partially oxidized the surface of the sheet material to increase its absorptivity to infrared radiation, such as that from a YAG or $CO_2$ laser used for cutting the material. Such pretreatment allegedly increased the cutting rates achievable with the infrared laser devices, and achieved quality equivalent to that obtained with conventional mechanical cutting apparatus.

U.S. Pat. No. 4,691,093, which issued to C. Banas, et al., discloses a laser welding device using multiple focal spots to overcome problems such as poor fit-up of mating surfaces of items to be welded, and in other applications where a broader bead profile is required. By adjustment of the twin spot focusing optics, the beam spots can be separated longitudinally along the seam to increase the meltpool link, or greater separation of the beams can allow one beam to effectively preheat the material prior to application of the subsequent laser spot. In any case, however, the speed and efficiency of the weld is limited by the power of the laser supply and the movement of the twin beams along the length of weld seam.

U.S. Pat. No. 4,857,697, which issued to M. Melville, contemplates a continuous seam welding apparatus which can include a plurality of laser beams directed onto the seam of sheet materials to be welded. Pulsed applications of laser energy are overlapped along the seam weld following cooling and stabilization of adjacent weld spots. In this way, each pulse has time to stabilize before being partially restruck by a subsequent pulse, and the weld seam is created by these alternately applied overlapping spots along the length of the butting seam between the sheet material pieces.

Another attempt to increase the efficiency of laser welding techniques is set forth in U.S. Pat. No. 4,330,699, which issued to M. Farrow. Here, the laser is modulated at an ultrasonic frequency to induce acoustic waves into the melt of a weld joint. Farrow teaches that it is best to apply the "sound laser" at lower power levels and following the application of a high powered welding laser. Both of these lasers, however, must travel over the entire length of the seam for proper application.

In applications requiring relatively long welds along a common seam line, it has also been found that problems arise in maintaining the proper gap width along the seam line to permit high quality connection. For example, in welding procedures which require joining of a seam line longer than about 30 inches (about 750 mm or more), thermal effects often cause the gap to tend to separate as the weld bead is applied at a first end, causing welding device alignment problems and compromising the efficiency and quality of the resulting weld. As used herein, the term "relatively long" will be understood to connote a seam line or weld which is sufficiently long to allow thermal effects to interfere with the maintenance of proper gap width and efficiency of the welding process. While the threshhold length may vary depending upon a number of variables including materials involved, gap width, sheet thickness, welding conditions, quality of edge cuts along the seam, and the like, thermal problems are almost always encountered when the seam line length exceeds about 750 mm.

Consequently, while many attempts have been implemented to address the continuing need to optimize laser welding speed and quality, each were limited by the length of the weld, power requirements for the laser devices applied, and effective welding speed along the length of the seam. While improvements to vision systems for monitoring the seam gap width and weld bead quality have been made, and methods for automatically aligning and fixturing sheets to be butt welded are now available, an apparatus and method for optimizing the speed of high quality laser welding to provide fast part cycle times with a relatively low capital cost has not been achieved heretofore.

DISCLOSURE OF THE INVENTION

It is an object of the present invention to provide a laser welding system to accommodate large sheets with relatively long weld lengths, wherein the system has a relatively low capital cost with a high part cycle rate.

It is another object of the present invention to provide an apparatus and method which optimizes part cycle rates and laser welding operations by minimizing sheet handling requirements, combining an effective and automatic part fixturing arrangement, and minimizing actual welding time.

It is yet another object of the present invention to provide an improved laser welding apparatus and method for butt welding a plurality of metallic sheets along a relatively long common seam line by utilizing a plurality of substantially identical laser welding devices which can be simultaneously operated to weld different, but overlapping, portions of such common seam line.

It is another object of the present invention to provide an improved laser welding apparatus which includes the use of multiple welding heads which operate simultaneously on contiguous segments of the common seam line between abutting metallic parts, with each of those laser welding devices having independent seam tracking capabilities.

In accordance with one aspect of the present invention, butt welding a plurality of metallic sheets along a relatively long common seam line is accomplished by providing a welding table with an upper surface on which a plurality of metallic sheets are supported and aligned such that their common seam line is situated along a longitudinal axis of the table. A plurality of laser welding devices are provided above the upper surface and aligned along the common seam line and spaced substantially equidistant from one another at a first distance along the longitudinal axis. In a preferred arrangement, each welding device independently tracks the portion of the seam line which it is to weld. A plurality of sheets are loaded onto the upper surface, whereby a first sheet is loaded along a transverse axis of the welding table from one of a pair of transversely spaced side edges. A second sheet is provided generally along the transverse axis and from the opposite side edge of the table. The metallic sheets are aligned on the upper surface in abutting relationship along the seam line and clamped for welding. Thereafter, relative movement between the welding devices and the seam line along the longitudinal axis is provided while the welding devices are simultaneously operated, whereby each laser welds only a portion of the sheets along the seam line. The length of the relative movement is greater than the first spacing distance to insure that a continuous weld bead is provided along the common seam line. In a preferred embodiment, the individual sheets are moved into intimate abutting relationship, and, thereafter clamped against further movement, by a plurality of electromagnetic devices.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
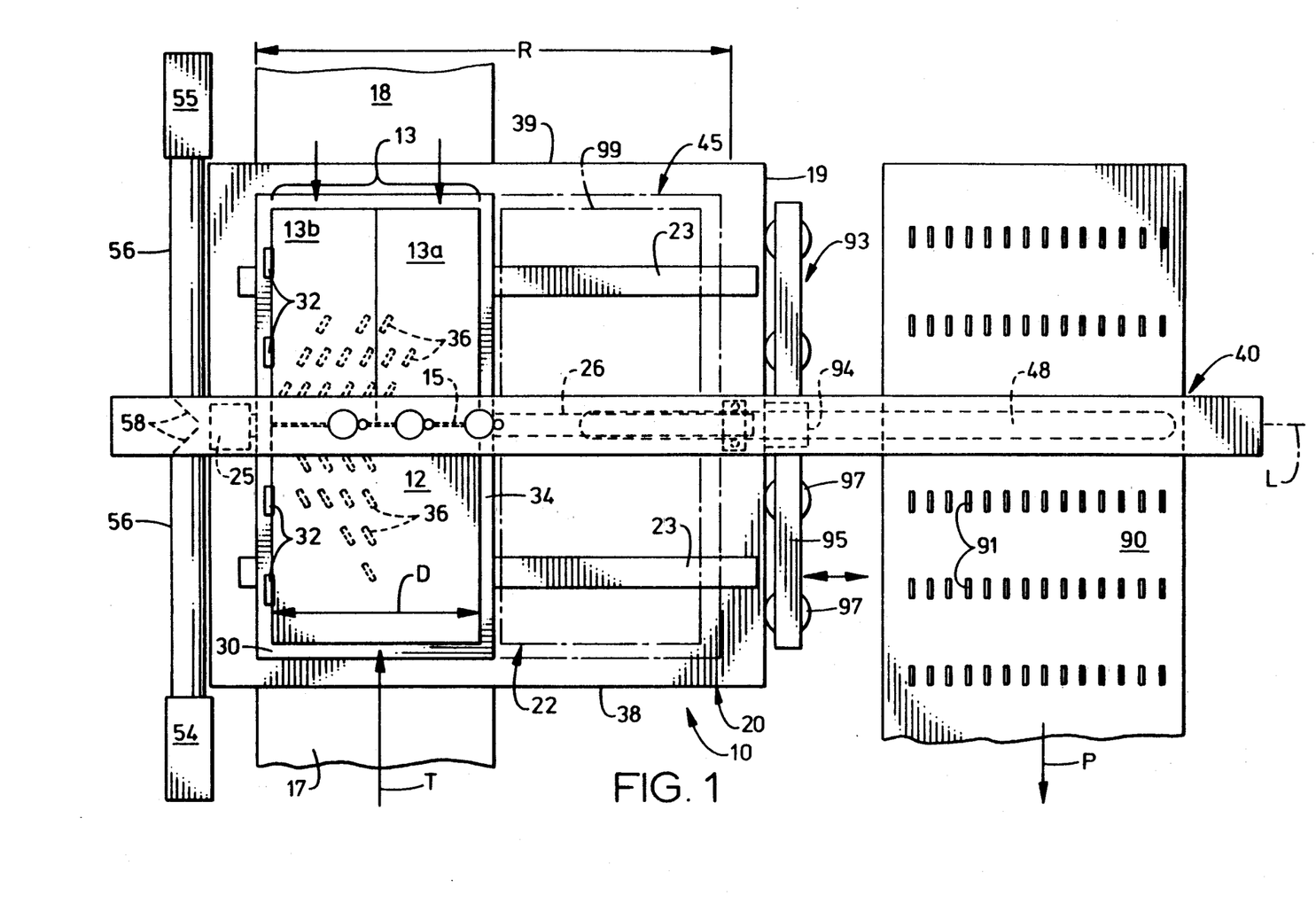
FIG. 1 is a partial top plan view of an improved laser welding apparatus made in accordance with the present invention.

Referring now to the drawings in detail, wherein like numerals indicate the same elements throughout the views, FIG. 1 represents a partial top plan view (in substantially schematic format) of an improved laser welding apparatus 10 made in accordance with the present invention. Generally, laser welding apparatus 10 comprises a welding table 20 having an upper surface 22 provided with a pair of spaced guide rails 23. A movable plate or sheet support carriage 30 is mounted on guide rails 23 for reciprocable movement parallel to the longitudinal axis L of apparatus 10. A ball screw 26 and ballscrew drive motor 25 are illustrated in phantom in FIG. 1, as being arranged generally along longitudinal axis L for selectively reciprocating movable plate 30 along table 20.

It is contemplated that a ballscrew nut (e.g., nut 28 shown in FIG. 2) would be associated with plate 30 to convert rotational movement of ballscrew 26 into longitudinal movement of plate 30 relative to table 20. As illustrated in FIG. 1, plate 30 would have a range of movement (R) across a substantial portion of table 20.

The top surface 34 of movable plate 30 may also preferably include a plurality of rollers 36, which may include some powered rollers, to facilitate movement of metallic sheets (e.g., 12, 13a and 13b) into abutting relationship along a common seam line (e.g., 15) therebetween. As indicated in phantom in FIG. 1, rollers 36 might preferably be slightly offset with respect to transverse axis T to urge incoming metallic sheets toward longitudinal axis L and against preliminary alignment stops 32 protruding upwardly from top surface 34. Stops 32 may be utilized to insure a consistent reference for left margin of abutted sheets, and to assist in preliminary alignment of sheets.

FIG. 1 illustrates movable plate 30 as it would be situated on upper surface 22 to receive incoming metallic sheets (e.g., 12 and 13, sheet 13 shown as comprising sheets 13a and 13b). Particularly, loading conveyor 17 is located adjacent the lower edge of movable table 30 to provide a first sheet (e.g., 12) generally along transverse axis T from a first side edge 38 of table 20. Conveyor 17 can comprise a live roller conveyor, a belt conveyor, or (as will be described below) a mechanical or robotic loading device. As will be understood, the relative dimensions of loading conveyor 17, top surface 34, and laser welding apparatus 10 in general, can be designed to accommodate metallic sheets having varying widths (e.g., width D) as appropriate. The release of a particular sheet 12 from conveyor 17 onto top surface 34 may be controlled by an operator, or automatically controlled by a computer or other control mechanism.

Figure 2:
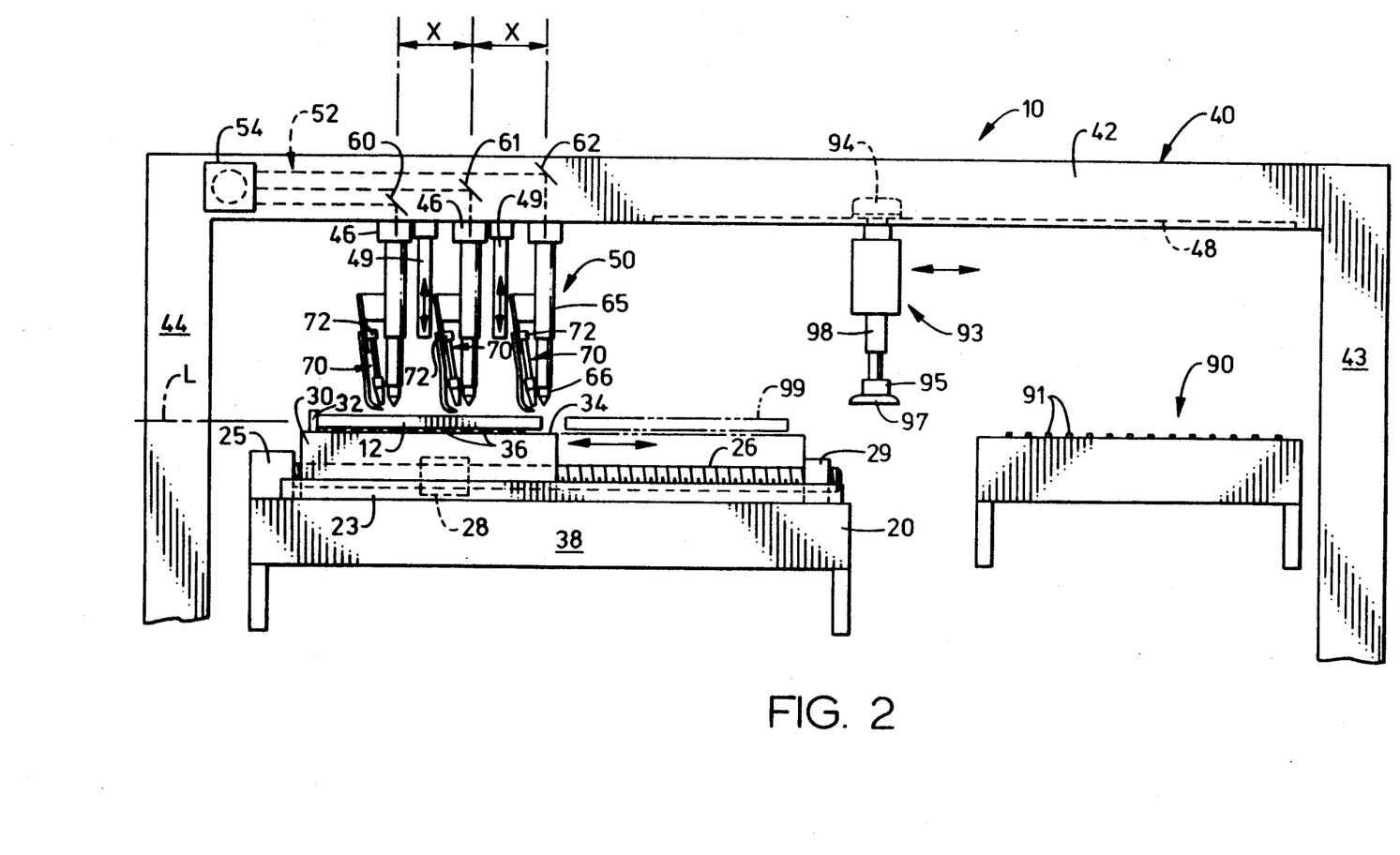
FIG. 2 is a partial front elevational view of the laser welding apparatus of FIG. 1.

Similarly a second sheet 13 (e.g., sheets 13a and 13b) will be provided via loading conveyor 18 generally along transverse axis T from the opposite side edge 39 of welding table 20. Preliminary alignment of first and second sheets 12 and 13, respectively, may preferably be accomplished along common seam line 15 by providing one or more retractable alignment stops 49 between the incoming sheet products along longitudinal axis L. As best illustrated in FIG. 2, it is preferred that retractable stops 49 depend downwardly from the under-surface of cross beam 42 between adjacent welding devices 50. It is understood, however, that stops 49 could alternately be extended upwardly from adjacent top surface 34. During supply of sheets 12 and 13 to table 20, stops 49 would be extended to a position adjacent top surface 34 to provide preliminary alignment of the facing proximal edges of sheets 12 and 13 along their common seam line 15. Following initial alignment, stops 49 would be retracted to enable final alignment of sheets 12 and 13 in intimate abutting relationship.

A bridge or gantry 40 is located above upper surface 22 and top surface 34, and supports a plurality of laser welding devices 50. As best illustrated in FIG. 2, it is contemplated that bridge 40 will include a cross beam 42 supported on opposite ends by vertical columns 43 and 44, respectively. It is preferred that at least a portion of cross beam 42 above welding table 20 includes a hollow portion for housing laser beams and optical devices for directing the beams to welding devices 50, as appropriate.

One or more laser sources (e.g., 54 and 55) are provided to supply a laser beam or beams of predetermined wavelength and power to welding apparatus 10. As illustrated in FIG. 1, several laser sources 54 and 55 may be spaced somewhat remotely from gantry 40, and their beams might be supplied through appropriate protective conduits 56. Appropriate reflecting mirrors (e.g., 58) would be provided to direct the incoming radiant energy into the hollow portion of cross beam 42 for supply to the welding devices 50.

As illustrated in FIG. 2, a plurality of welding device supports 46 attach to the lower portions of cross member 42 for location and support of a plurality of welding devices 50. Additional reflecting mirrors, beam splitters and/or similar optics (e.g., 60-62) as desired may be incorporated direct appropriate portions of the incoming laser beams 52 to the individual welding devices 50.

Figure 3:
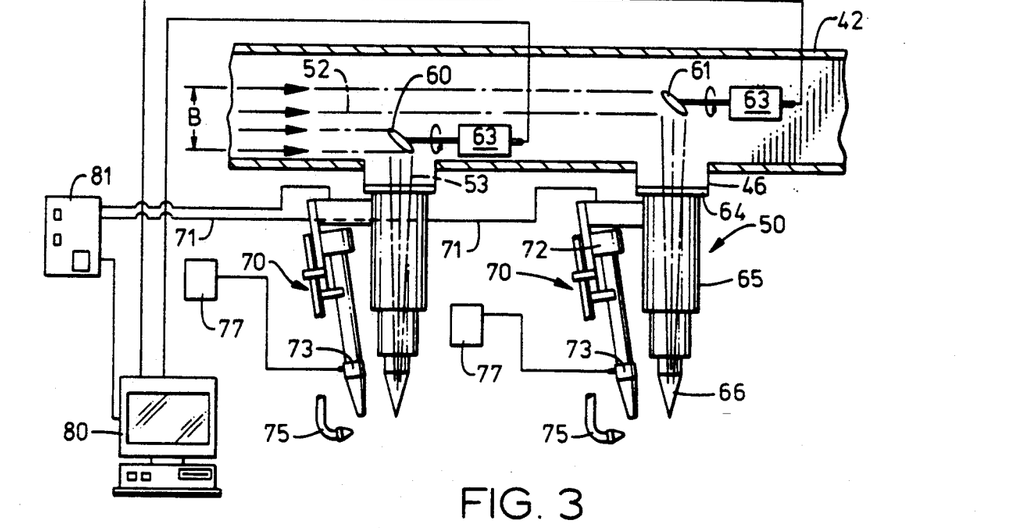
FIG. 3 is an enlarged, partial cross-sectional view of a portion of the laser welding apparatus of FIGS. 1 and 2.

As best illustrated in FIG. 3, one or more incident laser beams 52 will be directed to welding devices 50, such as via intercepting beam splitter 60 and mirror 61, respectively. An embodiment wherein beam 52 having a predetermined diameter B is divided into two approximately equal portions by a first intercepting beam splitting mirror 60 and a second reflecting mirror 61 is shown in FIG. 3. It may also be preferred to provide mirrors 60 and 61 with rotary control stages 63 to permit adjustment of the location of the focal point or beam spot of any particular welding device 50 in operation. As indicated in FIGS. 1 and 2, a laser welding apparatus 10 made in accordance with the present invention may include a plurality of welding devices 50, supplied from one or more laser sources (e.g., 54 and 55). Consequently, the nearer half (not shown) of cross beam 42 illustrated in FIG. 3 might also preferably include similar optical devices for providing a laser beam to additional welding devices 50.

As best seen in FIGS. 2 and 3, it is also contemplated that a plurality of welding devices 50 will be independently adjustable in a direction parallel to transverse axis T in order to track a seam line 15 for accurate application of welding energy therealong. It is further preferred that such individual tracking and alignment with portions of a common seam line 15 will be facilitated by a separate visual imaging system or alignment device 70 associated with each welding device 50. While each welding device 50 is preferably provided with its own adjustment apparatus, there may be applications (e.g., where sheets to be welded have very high quality sheared abutting edges) in which some of the welding devices might be adjustable only in conjunction with one or more other welding device.

Co-pending U.S. patent application Ser. No. 07/508,904, filed Apr. 12, 1990 in the name of the present inventor and others, sets forth a preferred arrangement for automatically aligning a butt welding device along a seam line and including a line scan camera (e.g., 72) which monitors a projected image in an illuminated vision area. The disclosure of such co-pending application is hereby incorporated herein by reference.

A seam sensor circuit 71 provides monitored data concerning the gap between confronting edges of sheets to be butt welded for use in a camera controller 81 and a system controller, such as computer 80. In this way, each individual welding device can be independently adjusted along transverse axis T to precisely and accurately track the portion of seam line 15 which it is traversing during welding operations. As will be understood, rotating, oscillating or translating stages 63 can provide movement of reflecting mirrors (e.g., 60-62) for moving the beam spot of a welding device 50 in response to control signals. As will be understood, it is the beam spot which must be adjusted to precisely track seam 15. A focusing lens 64 is provided in each welding device 50 to concentrate the laser energy onto the surfaces to be welded.

Once a plurality (typically two) of sheets (e.g., 12 and 13) are supplied to top surface 34, and aligned in close abutting relationship along a common seam line (e.g., see line 15 of FIG. 1), the sheets will be situated directly below welding devices 50. Welding devices 50 are each preferably effectively spaced from one another at a predetermined distance (e.g., distance X) in a direction along longitudinal axis L. Distance X may differ between particular applications, depending upon the length of the common seam line to be welded, the number of welding devices 50 available for welding, the welding power available for each welding device, and the desired reciprocation speed of movable plate 30. Generally, the welding devices will be equally spaced in most applications. It should be noted, however, that the actual distance between adjacent welding devices 50 is not critical. It is the beam spot of each welding device, as applied to the common seam line 15, which must be spaced apart along axis L and seam line 15. As used herein, the term "effectively spaced" will be understood to connote that the critical spacing of the adjacent beam spots is provided by spacing and/or beam orientation of the welding devices themselves.

For example, where three welding devices are available and aligned along common seam line 15, distance X would preferably be slightly less than one-third D, where D is the effective length of common seam line 15 to be welded. As shown in FIG. 2, it is preferred that prior to initiating welding procedures and movement of plate 30, the right-most welding device 50 should be aligned substantially adjacent the right-most end of seam line 15. Thereafter, relative movement between welding devices 50 and seam line 15 is created by reciprocation of movable plate 30 toward vertical column 43 by energizing ballscrew drive 25 accordingly. Simultaneously, welding devices 50 are also energized in order to weld sheets 12 and 13 together. Each particular welding device 50 welds a different portion of seam line 15, and that portion is determined by initial location of welding devices 50 and movement of plate 30. As will be understood, the distance which plate 30 is reciprocated toward vertical column 43 should be slightly greater than the distance X in order to insure some overlap of welding along seam line 15.

Following welding operations, further movement of plate 30 preferably moves the now welded sheets (i.e., welded sheet 99) from below welding devices 50 into an unloading area 45 (as best seen in FIGS. 1 and 2). Means 93 for removing welded sheets from plate 30 is reciprocably mounted on cross beam 42, such as by connection 94 slidably received within guide track 48. Removal means 93 preferably includes one or more telescoping extendable cylinders 98 which support a transversely oriented cross-bar 95, which in turn supports a plurality of clamping devices 97. Removal means or device 93 reciprocates along guide track 48 to position itself over unloading area 45, whereupon extendable cylinders 98 lower the cross bar 95 and clamping devices 97 into contact with a welded finished product 99.

It is contemplated that clamping devices 97 may comprise suction devices, electromagnetic devices, mechanical clamps, or similar clamping structure for engaging and grasping a welded sheet 99 (shown in phantom in FIG. 1). The welded sheet is lifted from movable table 30 and moved longitudinally parallel to axis L and the welded seam line 15 onto unloading conveyor 90 having a plurality of rollers 91. As soon as finished product 99 is removed, table 30 can return to its loading position for receiving additional sheets 12 and 13 to be aligned and welded. Some of the rollers 91 on conveyor 90 can be powered to remove finished products 99 in a direction indicated by the arrow P, generally perpendicular to longitudinal axis L.

Figure 4:
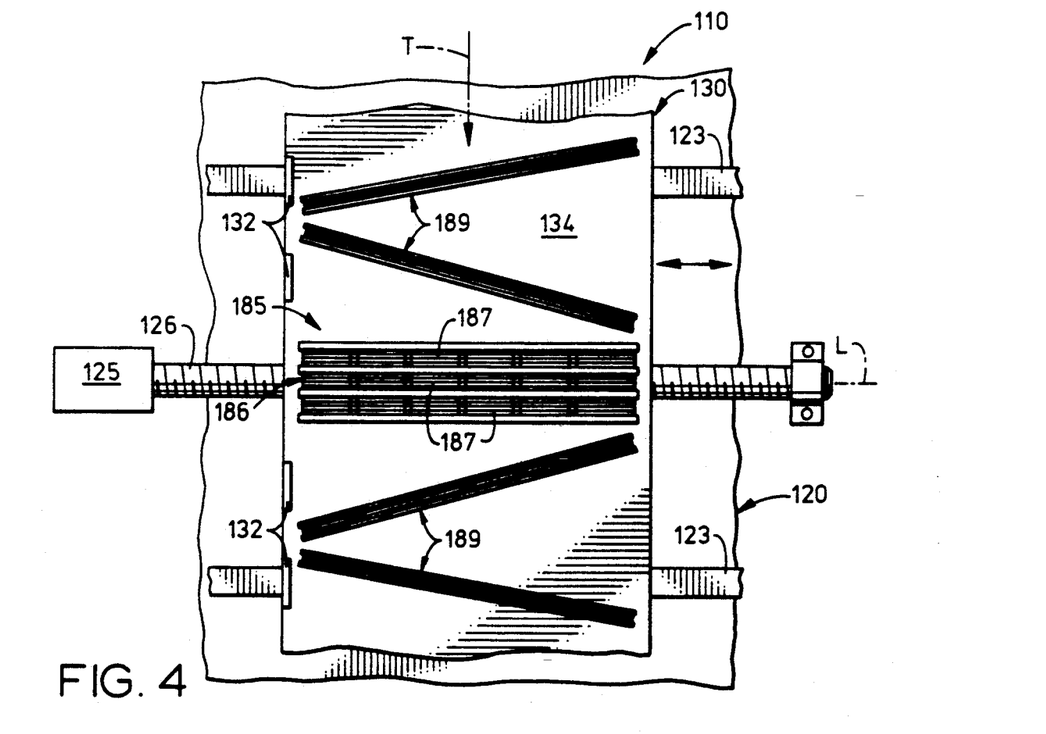
FIG. 4 is a partial top plan view of an alternate preferred embodiment of the upper surface of the welding table of the present invention.

FIG. 4 illustrates a preferred embodiment of the top surface 134 of a movable plate 130 made in accordance herewith. Particularly, instead of rollers (e.g., 36 shown in FIGS. 1 and 2), a plurality of electromagnetic devices 185 and 189 are illustrated as located along top surface 134. As set forth in application Ser. No. 07/508,901 filed Apr. 12, 1990, and issued as U.S. Pat. No. 5,023,427 (the '427 patent) on Jun. 11, 1991 (the disclosure of such patent being hereby incorporated herein by reference), appreciably magnetic individual sheets can be automatically supported and aligned along a common seam line by creating an effective magnetic pole along the proximal edge of one of the sheets, and an effective magnetic pole of opposite polarity along the confronting proximal edge of the other of said sheets.

As set forth in the '427 patent, it is contemplated that electromagnet 186 and its excitation coils 187 can be utilized to create the effective magnetic poles necessary to automatically align metallic sheets in intimate abutting relationship along a common seam line as required herein. Moreover, once in close abutting relationship, the metallic sheets can be clamped in place by magnetic hold downs, including the additional electromagnets 189. As further noted in the '427 patent, effective vibrating forces to reduce friction of sheets to be aligned and clamped can be implemented by energizing selected electromagnets with alternating current. Alternately, clamping can be accomplished by mechanical hold downs or the like.

The balance of the structural features of movable plate 130 are substantially the same as those described above with respect to movable plate 30. However, it has been further determined that in order to control thermal energy created by Joule heat from excitation of the electromagnets, means for cooling electromagnet alignment device 185 and the additional electromagnets 189 may be preferred. Particularly, small gap widths common in laser welding can be significantly effected by varying temperatures due to expansion and contraction. Consequently, the electromagnets of alignment device 185 and additional electromagnets 189 might preferably be cooled by providing cooling channels (not shown) through the coils and poles thereof, or via other heat control means known in the industry.

Figure 5:
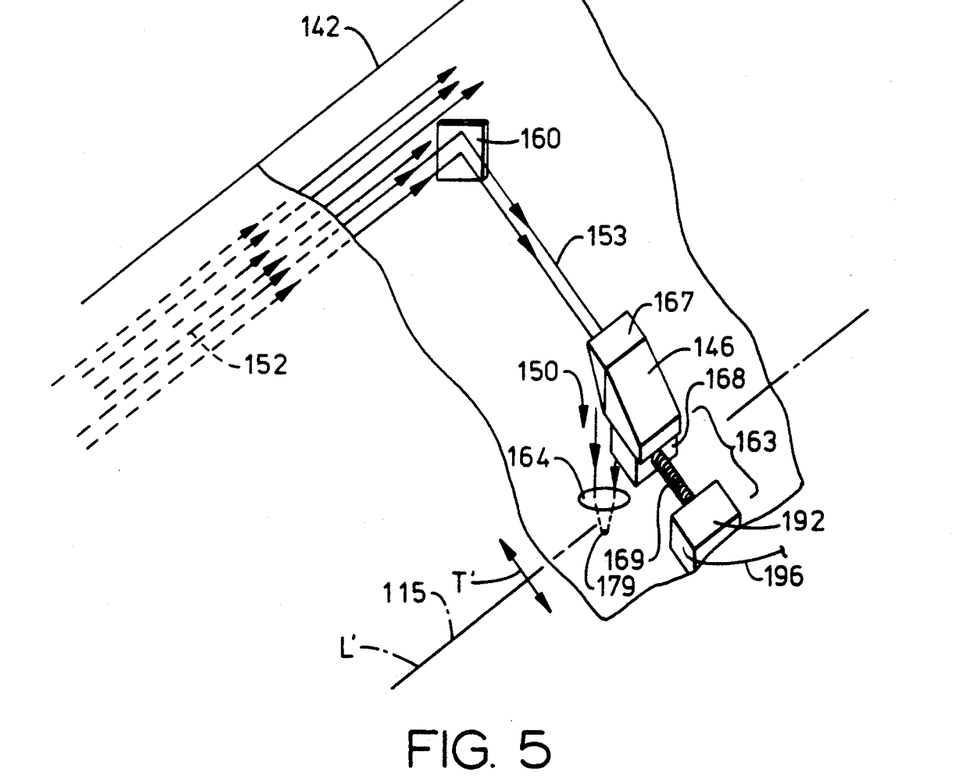
FIG. 5 is a schematic illustration of an alternate embodiment of a preferred arrangement for providing transverse adjustment of the welding devices of the present invention.

FIG. 5 illustrates schematically an embodiment wherein the signal received from the seam tracker or visual imaging system (e.g., 70 of FIG. 2) controls a motorized translational stage 163 to enable welding device 150 to dynamically track seam line 115. Particularly, welding device 150 represents one of a number of similar welding devices which would be spaced along a cross beam 142 of a gantry or bridge as described above. In order to enable adjustment translation of laser beam spot 179 transversely (i.e., in direction T') across seam line 115 (i.e., perpendicularly to longitudinal axis L'), mirror 167 and focusing lens 164 are attached as a unit to translational stage 163 which can selectively move device 150 along transverse axis T'.

Stage 163 preferably comprises a laser support 146 slidably attached to cross beam 142 for reciprocation relative thereto, and a rotatable ballscrew 169 driven by a ballscrew motor 192 and threaded into a non-rotatable nut 168 attached to support 146. Rotational movement of ballscrew 169 thereby selectively translates welding device 150 and its beam spot 179 along axis T'. A portion 153 of incident laser beam 152 can be directed to mirror 167, such as by intercepting beam splitter or mirror 160, and transverse movement along axis T' will not effect the direction of beam portion 153 to focusing lens 164 In this arrangement, alignment of the laser optics need not be altered in order to provide dynamic tracking of seam line 115 by laser 150.

Any number of welding devices 150 can be spaced along cross beam 142 in this substantially on-line arrangement. Additionally, it is contemplated that welding devices 150 could equally be arranged in an off-line or off-axis manner, whereby an off-axis parabolic reflector (not shown) might be provided within a welding device as part of the mirror/focusing assembly to direct the laser spot onto the seam line.

Figure 6:
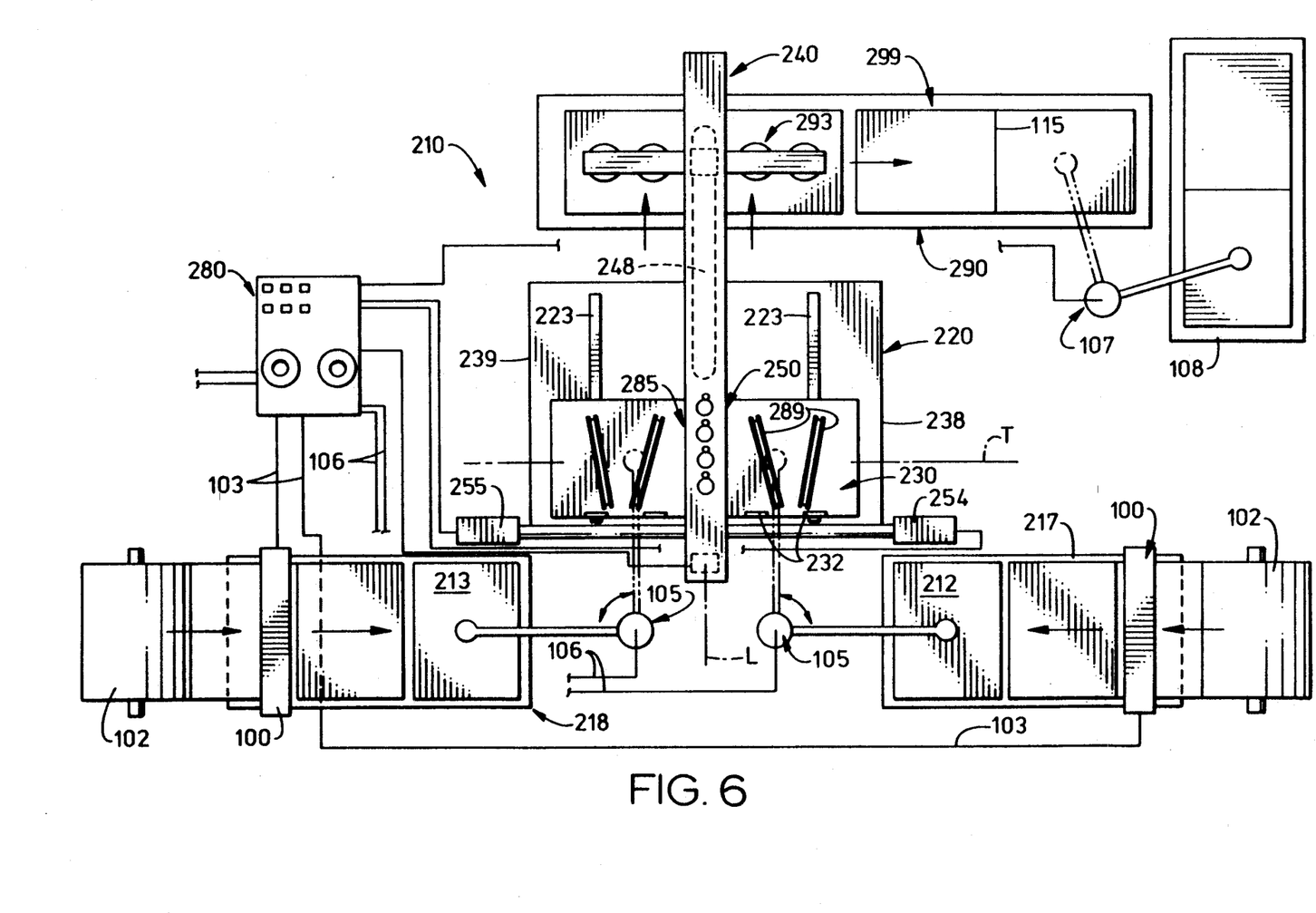
FIG. 6 is a partial top plan view in schematic form of an alternate preferred embodiment of a laser welding apparatus made in accordance with the present invention.

FIG. 6 illustrates yet another preferred embodiment of a laser welding apparatus 210 made in accordance herewith. Particularly, welding table 220, gantry or bridge 240, movable plate 230 with its electromagnetic alignment device 285 (actually hidden in this view below gantry 240 and welding devices 250) and electromagnets 289, removal means 293, and laser welding devices 250 are substantially identical in structure and operation to corresponding structure shown and described above. As illustrated, however, loading conveyors 17 and 18 have been substituted by off-line loading conveyor systems 217 and 218, respectively.

Loading conveyor system 217 provides for queing of sheet material 212 from a supply 102, which can be a coil supply, to a loading mechanism, such as robot 105. The sheet material is provided through a slitter or shear (e.g., single or double cut) 100 from which cut sheet 212 is conveyed, such as via a live roller conveyor section. The sheet is then lifted from loading conveyor system 217 by a loading robot 105, and placed onto movable table 230 in a direction generally parallel to transverse axis T. Similarly, loading conveyor system 218 supplies a second sheet 213 generally parallel to transverse axis T from the opposite side edge 239 of table 220.

After welding operations and pick-up by removal means 293, a finished product (i.e., welded sheet) 299 is moved along unloading conveyor 290 in a direction substantially perpendicular to longitudinal axis L for placement at a storage area 108 by an unloading robot 107. The entire welding apparatus 210 and its processes may be preferably controlled by a central control unit or computer 280 as illustrated.

Having shown and described the preferred embodiments of the present invention, further adaptions of the laser welding apparatus and method set forth herein can be accomplished by appropriate modifications by one of ordinary skill in the art without departing from the scope of the present invention. Several potential modifications have been mentioned, and others will be apparent to those skilled in the art. For example, relative movement between the welding devices and the common seam line between abutted sheets might be provided by movement of the welding devices along the bridge in place of or in addition to movement of the sheets relative to the bridge. Similarly, the direction of removal of finished products on the unloading conveyor could be modified to best conform with particular manufacturing procedures and processing arrangements. Accordingly, the scope of the present invention should be considered in terms of the following claims, and is understood not to be limited to the details of structure and operation shown and described in the specification and drawings.

I claim:

1. An improved high production laser welding apparatus for butt welding a plurality of metallic sheets along a relatively long common seam line, said apparatus comprising:

a welding table having an upper surface on which a plurality of metallic sheets may be supported for welding along a common seam line, a longitudinal axis along which said common seam line will be aligned, a transverse axis substantially perpendicular to said longitudinal axis, and a pair of transversely spaced side edges;

a plurality of substantially identical laser welding devices mounted above said upper surface and aligned such that their welding beams will be directed along said common seam line, said welding devices each being effectively spaced at a distance from one another along said longitudinal axis, and means for independently adjusting a plurality of said welding beams in a direction parallel to said transverse axis to track said common seam line;

means for loading sheets to be butt welded onto said upper surface, said loading means providing a first sheet generally along said transverse axis from one side edge of the table, and a second sheet generally along said transverse axis and from the other side edge;

means for aligning said metallic sheets on said upper surface in abutting relationship along said common seam line, said aligning means comprising means for relatively moving said sheets inwardly along said transverse axis into close alignment along said common seam line;

means for simultaneously moving said welding devices relative to said common seam line along said longitudinal axis, and means for simultaneously operating said welding devices to weld said aligned sheets together, whereby each laser welds only a portion of said sheets along said common seam line and the length of said relative movement is greater than said spacing distance between adjacent welding devices to insure some overlap of welding along said common seam line; and an unloading device for removal of a welded sheet from said welding table while additional sheets to be butt welded are simultaneously provided to said welding table.

2. The apparatus of claim 1, wherein said common seam line has a predetermined length, and said welding devices are spaced substantially equidistant from one another above said upper surface along said length.

3. The apparatus of claim 1, wherein said means for simultaneously moving said welding devices relative to said seam line comprises a movable portion of said upper surface of said table, said movable portion supporting said sheets and movable in a direction parallel to said longitudinal axis.

4. The apparatus of claim 1, wherein said aligning means comprises selectively retractable stops which can be moved to operable position to preliminarily align said sheets, and moved to retracted position prior to welding operations.

5. The apparatus of claim 1, further comprising a bridge located above said upper surface and supporting said laser devices, said bridge extending in a direction substantially parallel to said longitudinal axis.

6. The apparatus of claim 5, wherein said unloading device comprises a clamping apparatus attached to said bridge and movable in a direction parallel to said longitudinal axis.

7. The apparatus of claim 5, further comprising retractable stops attached to said bridge and extending downwardly therefrom in aligning operations to preliminarily align said sheets along said longitudinal axis.

8. The apparatus of claim 1, wherein said means for aligning said sheets in abutting relationship comprises a magnetic alignment device.

9. The apparatus of claim 1, wherein said means for aligning said sheets comprises a plurality of offset feed rollers mounted adjacent said upper surface to direct said sheets into abutting relationship along said common seam line.

10. The apparatus of claim 1, wherein said means for loading sheets to be butt welded comprises a pair of robots, one of said robots placing sheets on said upper surface from said transverse side edge of said table, and the other placing sheets from the other of said transverse side edges, whereby said sheets approach each other in a direction generally parallel to said transverse axis.

11. The apparatus of claim 1, wherein each of said laser welding devices is connected to an automatic alignment vision system for individually controlling and adjusting the transverse position of its welding beam to precisely align with said seam line.

12. An improved high production laser welding apparatus for butt welding a plurality of metallic sheets along a relatively long common seam line, said apparatus comprising:

a welding table having a reciprocable upper surface on which a plurality of metallic sheets may be supported for welding along a common seam line, a longitudinal axis along which said common seam line will be aligned, a transverse axis substantially perpendicular to said longitudinal axis, and a pair of transversely spaced side edges;

a bridge located above said upper surface and supporting said laser devices, said bridge extending in a direction substantially parallel to said longitudinal axis;

a plurality of substantially identical laser welding devices mounted on said bridge and aligned such that their welding beams will be directed along said common seam line, said welding devices each being effectively spaced at a distance from one another along said longitudinal axis, and each welding device beam being independently adjustable in a direction parallel to said transverse axis to track said common seam line;

means for loading sheet to be butt welded onto said upper surface, said loading means providing a first sheet generally along said transverse axis from one side edge of the table, and a second sheet generally along said transverse axis and from the other side edge;

means for aligning said metallic sheets on said upper surface in abutting relationship along a common seam line, said aligning means comprising means for relatively moving said sheets inwardly along said transverse axis into close alignment along said common seam line and at least one retractable alignment stop therebetween;

magnetic means for clamping said sheets in said abutted relationship along said common seam line;

means for simultaneously moving said welding devices relative to said common seam line along said longitudinal axis, and means for simultaneously operating all of said welding devices to weld said sheets together, whereby each laser welds only a portion of said common seam line between said sheets, and the length of said relative movement is greater than said spacing distance between adjacent welding devices to insure some overlap of welding along said common seam line and an unloading device for removal of a welded sheet from said welding table while additional sheets to be butt welded are simultaneously provided to said welding table.

13. The apparatus of claim 12, wherein said means for aligning said sheets in abutting relationship comprises a magnetic alignment device.

14. The apparatus of claim 12, wherein said common seam line has a predetermined length, and said welding devices are substantially equally spaced above said upper surface along said length.

15. An improved high production method for butt welding a plurality of metallic sheets along a long common seam line between said sheets, said method comprising the following steps:

providing a welding table having an upper surface on which a plurality of metallic sheets may be supported for welding along a common seam line, a longitudinal axis along which said common seam line will be aligned, a transverse axis substantially perpendicular to said longitudinal axis, and a pair of transversely spaced side edges;

locating a plurality of substantially identical laser welding devices above said upper surface and aligning said devices such that their welding beams will be directed along said common seam line, said welding devices each being effectively spaced at a distance from one another along said longitudinal axis, and each welding device beam being independently adjustable in a direction parallel to said transverse axis to track said common seam line;

loading a plurality of sheets to be butt welded onto said upper surface, said loading step providing a first sheet generally along said transverse axis from one side edge of the table, and a second sheet generally along said transverse axis and from the other side edge;

aligning proximal edges of said metallic sheets on said upper surface in abutting relationship along said common seam line by urging said sheets relatively inwardly and forward said longitudinal axis;

magnetically clamping said sheets in abutted relationship along said common seam line;

simultaneously operating said welding devices while providing relative movement between said welding beams and said common seam line along said longitudinal axis, whereby each welding beam welds only a portion of said sheets along said common seam line and wherein said relative movement extends along said longitudinal axis for a length which is greater than said spacing distance to insure some overlap of welding along said common seam line; and unloading a welded sheet from said welding table while other sheets to be butt welded are simultaneously provided to said welding table.

16. The method of claim 15, wherein said step of operating said laser devices comprises individually controlling the transverse positioning of each laser beam to independently track the seam line during welding procedures.

17. The method of claim 15, wherein said step of providing relative movement between said welding beams and said seam line comprises reciprocating a movable portion of said upper surface of said table supporting said sheets in a direction parallel to said longitudinal axis while said laser welding devices remain substantially stationary along said longitudinal axis.

18. The method of claim 15, wherein said step of aligning said sheets in abutting relationship comprises creating an effective magnetic pole along the abutting edge of one or more of said sheets on said upper surface, and creating an effective magnetic pole of opposite polarity along the confronting edge of an oppositely facing sheet to cause magnetic attraction therebetween to automatically align such edges in intimate abutting relationship.

19. The method of claim 15, wherein said unloading step comprises moving said welded sheet in a direction parallel to said longitudinal axis and said common seam line.

20. An improved high production laser welding apparatus for butt welding a plurality of metallic sheets along a relatively long common seam line, said apparatus comprising:

a welding table having a reciprocable upper surface on which a plurality of metallic sheets may be supported for welding along a common seam line, a longitudinal axis along which said common seam line will be aligned, a transverse axis substantially perpendicular to said longitudinal axis, and a pair of transversely oppositely spaced side edges;

a plurality of laser welding devices mounted above said upper surface, spaced along said longitudinal axis and aligned such that their welding beams will be directed along said common seam line;

means for loading a plurality of sheets to be butt welded onto said upper face, said loading means having a first means for providing a first sheet generally along said transverse axis from one side edge of the table, and second means for providing a second sheet generally along said transverse axis and from said oppositely spaced side edge;

means for aligning said metallic sheets on said upper surface in abutting relationship along said common seam line, said aligning means comprising means for relatively moving said sheets inwardly along said transverse axis into close alignment along said common seam line and at least one retractable alignment stop therebetween;

magnetic means for clamping said sheets in said abutted relationship along said common seam line;

means for simultaneously moving said welding devices relative to said common seam line along said longitudinal axis, and means for simultaneously operating all of said welding devices to weld said sheets together, whereby each laser welds only a portion of said common seam line between said sheets, and the length of said relative movement is greater than said spacing distance between adjacent welding devices to insure some overlap of welding along said common seam line; and means for unloading sheets which have been welded together along said common seam line, said unloading means comprising means for moving said welded sheets in a direction parallel to said longitudinal axis and said common seam line.

21. The apparatus of claim 20, wherein said first and second means for providing sheets each comprise a conveyor which supplies sheets to be loaded to respective oppositely spaced side edges.

22. The apparatus of claim 20, wherein said means for unloading comprises a removal device which reciprocates along a cross beam located above said welding table along said longitudinal axis.

23. An improved method for butt welding a plurality of metallic sheets along a relatively long common seam line between said sheets, said method comprising the following steps:

providing a welding table having a reciprocable upper surface on which a plurality of metallic sheets may be supported for welding along a common seam line, a longitudinal axis along which said common seam line will be aligned, a transverse axis substantially perpendicular to said longitudinal axis, and a pair of transversely oppositely spaced side edges;

locating at least one laser welding device above said upper surface and aligning said device such that its welding beam will be directed along said common seam line, said welding beam being independently adjustable in a direction parallel to said transverse axis to track said common seam line;

loading a plurality of sheets to be butt welded onto said upper surface, said loading step including the steps of providing a first sheet generally along said transverse axis from a first side edge of the table, and providing a second sheet generally along said transverse axis and from the opposite side edge;

aligning proximal edges of said metallic sheets on said upper surface in abutting relationship along said common seam line by urging said sheets relatively inwardly said preliminary alignment stops adjacent said longitudinal axis;

retracting said preliminary alignment stops and completing final alignment in intimate abutting relationship along said common seam line;

magnetically clamping said sheets in abutted relationship along said common seam line;

welding said aligned sheets together along said common seam line; and unloading said welded sheets by moving them in a direction substantially perpendicular to said longitudinal axis and said common seam line.

24. The method of claim 23, wherein said unloading step comprises lifting the welded sheets from said table and moving them in a direction parallel to said longitudinal axis so that other sheets to be welded can be loaded onto said upper surface.

25. The method of claim 24, further comprising the step of placing an unloaded welded sheet on a conveying device for further processing.

* * * * *